Figure 1:
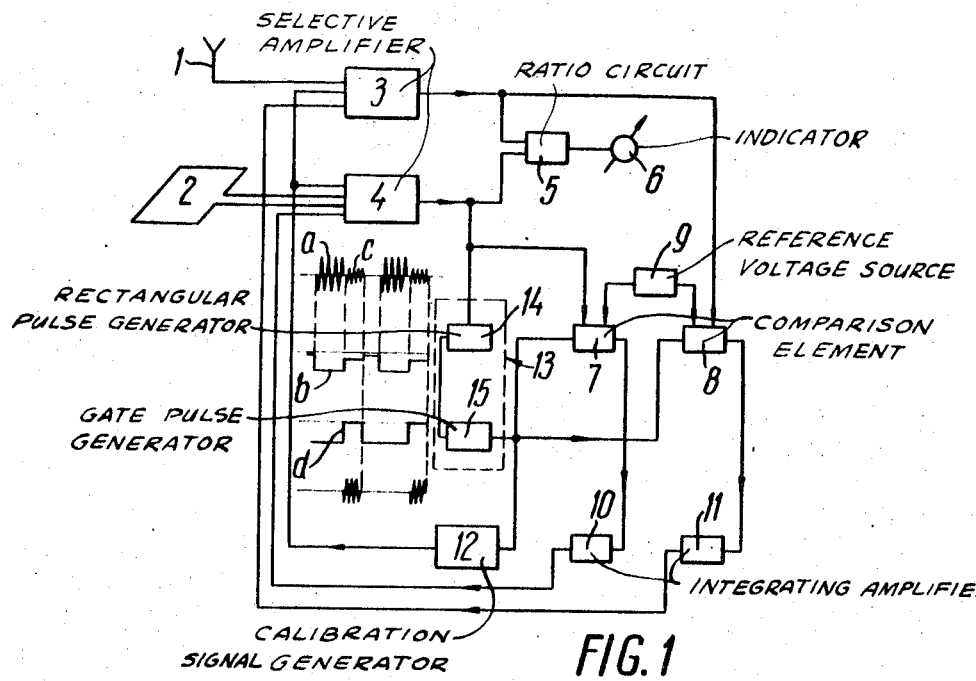

United States Patent [19]

Rogachev et al.

[11] 3,746,978

[45] July 17, 1973

[54] APPARATUS FOR MEASURING ELECTRICAL RESISTANCE OF ROCKS BY THE AMPLITUDE METHOD DURING GEOPHYSICAL MINERAL PROSPECTING

[76] Inventors: Boris Vasilievich Rogachev, ulitsa Sysoeva, 4, Reutov Moskovskoi Oblasti; Naum Abramovich Organovsky, ulitsa Gorkogo, 6, kv. 79, Zhukovsky Moskovskoi Oblasti; Ertel Sergeevich Sedelnikov, ulitsa, 39, korpus 2, kv. 18; Mikhail Mikhailovich Charsky, 13, korpus 1, kv. 3, both of Moscow, all of U.S.S.R.

[22] Filed: Aug. 2, 1971

[21] Appl. No.: 168,085

[52] U.S. Cl............... 324/6, 324/7, 324/130, 324/140 D
[51] Int. Cl............................................ G01v 3/12
[58] Field of Search............... 324/6, 7, 130, 140 R, 324/140 D

[56] References Cited
UNITED STATES PATENTS

| | | | |
|---|---|---|---|
| 3,594,633 | 7/1971 | Barringer | 324/6 |
| 3,105,230 | 9/1963 | MacIntyre | 324/130 UX |
| 3,461,385 | 8/1969 | Bayer | 324/130 |
| 3,541,320 | 11/1970 | Beall | 324/130 UX |
| 3,497,805 | 2/1970 | Camnitz | 324/140 R |

FOREIGN PATENTS OR APPLICATIONS

| | | | |
|---|---|---|---|
| 184,361 | 9/1966 | U.S.S.R. | 324/7 |
| 118,562 | 7/1958 | U.S.S.R. | 324/7 |

Primary Examiner—Gerard R. Strecker
Attorney—Eric H. Waters, John G. Schwartz and J. Harold Nissen

[57] ABSTRACT

A device for geophysical prospecting using radiotelegraph signals comprises a magnetic field strength sensor and an electric field strength sensor each connected to a selective amplifier. The amplifiers feed a meter measuring the ratio of their output amplitudes, which corresponds to a certain value of rock electric resistance. The device is provided with means for amplifier gain adjustment control in the form of an oscillator whose frequency is equal to that of the radio transmitting station used for prospecting. The oscillator signal passes through the amplifiers during spacing intervals between radiotelegraph signals of the transmitting station. The amplifiers output stages comprise elements for comparing the voltage of the amplified signal with that of a reference signal. A drift of the amplifier gain will change the output of the comparison elements and the automatic gain control system will adjust the gain of the amplifiers.

2 Claims, 2 Drawing Figures

APPARATUS FOR MEASURING ELECTRICAL RESISTANCE OF ROCKS BY THE AMPLITUDE METHOD DURING GEOPHYSICAL MINERAL PROSPECTING

The present invention relates to the improvement of devices for geophysical prospecting of rocks with the help of radiotelegraph signals and can find applications in prospecting and survey of both high-and low-conducting ores as well as in geological mapping.

It is common knowledge that the nature of a rock can be determined from the value of its electric resistance which, in its turn, is characterized by the ratio of electric and magnetic field strength in the particular rock. Such fields are usually generated, especially when it is required to prospect deeply deposited rocks, with the help of very low frequency signals of radio transmitting stations operating in the telegraph mode. Such a station transmits signals of a certain amplitude and of different durations, e.g., dots and dashes. The signals are divided by spacing intervals. The duration of a signal plus a spacing interval is about 0.1 sec (from 0.01 to 0.5 sec). In this case the electric resistance of a rock can be found from the following formula.

$$\rho = (1/2\pi f \eta)(E/H)^2$$

where
$\rho$ is the electric resistance of a rock,
$\eta$ is the permeability,
$f$ is the operating frequency of the transmitting station,
$E$ is the strength of the horizontal electric field in the rock,
$H$ is the strength of the horizontal magnetic field.

Widely known in the art of geophysical prospecting is a device which measures the value of the electric resistance ($\rho$) of rocks. The device comprises an electric field strength sensor and a magnetic field strength sensor each connected to a separate selective amplifier that is tuned to the frequency of the transmitting station. The amplifier outputs are connected to a circuit for determining the ratio or the square of the ratio between electric and magnetic field strengths. The output of this circuit is fed to a calibrated display. The value of $\rho$ measured in this way characterizes the rock which is being studied.

Any change in parameters of one or both amplifiers caused, for instance, by a temperature drift, affects their gains, distorts the measured ratio of electric and magnetic field strengths and introduces errors in the obtained value of the rock electric resistance. To reduce these errors the respective equipment is provided with special units for calibrating and adjusting the gains of the amplifiers. While using such units, however, the operator is obliged to periodically switch off the equipment in order to calibrate and adjust the latter, which results in breaks of the measurement procedure.

The calibration process reduces the efficiency of measurements and becomes quite intolerable when the geophysical survey is carried out from a vehicle, e.g., during an aerial electric survey, since in the course of equipment calibration procedure pieces of terrain fall out of the analysis.

The object of the present invention is to provide a device for geophysical prospecting in which the amplifier gain can be periodically and automatically calibrated and adjusted without de-energizing the measurement equipment.

The above and other objects are achieved by designing a device which, for the purposes of geophysical prospecting, measures the electric resistance of rocks with the help of radio telegraph signals and which, according to the invention, comprises a calibration signal generator whose frequency is equal to that of the transmitting station and whose output is electrically connected to each of the selective amplifiers, the output of one of them and the input of the generator being coupled through a pulse shaper used to trigger the generator at the beginning of every spacing interval between radio-telegraph signals, while the outputs of both receivers are connected to elements for comparing the reference voltage with the voltage appearing at the amplifier outputs when the generator is turned on, the comparison elements being also triggered by pulse shaper signals and connected with their outputs to the gain control system of the respective amplifier.

This design ensures high stability and efficiency of the device's performance, since it eliminates the requirement to periodically de-energize the whole of the measurement system and makes it possible to calibrate and adjust the amplifiers during spacing intervals between signals of the transmitting station, i.e., actually during idle intervals in the operation of the device.

It is expedient that the amplifier should use an automatic gain control circuit while its input should be connected, via amplifiers-integrators to the outputs of comparison elements.

This arrangement allows to make the process of amplifier calibration and control completely automatic.

Figure 2:
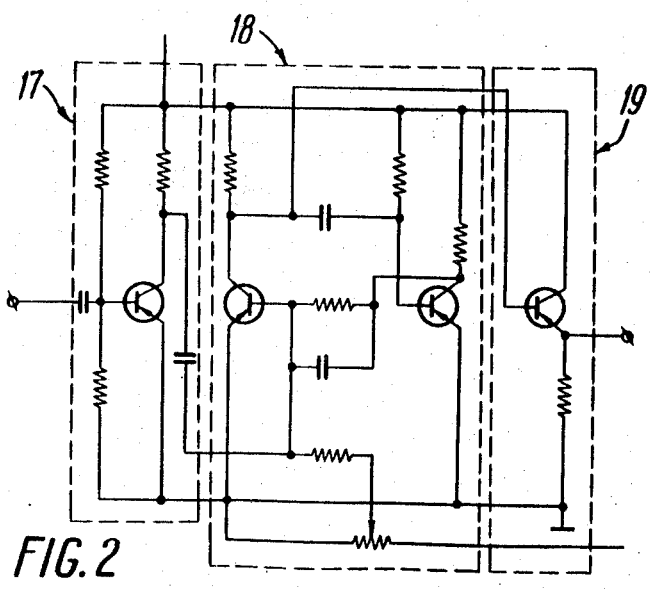

The invention will be better understood from the following description of an embodiment of the device for geophysical prospecting given by way of example with reference to the accompanying drawings in which:

FIG. 1 presents a block diagram of the device for geophysical prospecting,

FIG. 2 presents a schematic diagram of a version of the pulse shaper used to trigger the calibration signal generator and the comparison elements.

The device for geophysical prospecting of rocks with the help of radiotelegraph signals transmitted by a radio station (not shown in FIG. 1) comprises a sensor 1 of electric field strength and a sensor 2 of magnetic field strength connected to the inputs of selective amplifiers 3 and 4 respectively. The functions of such amplifiers can be performed by any known amplifiers provide with an automatic gain control circuit.

The amplifier 3 and 4 outputs are connected to a circuit 5 designed to determine the ratio of electric and magnetic field strengths. In certain cases the circuit 5 can be arranged so as to determine the square of the ratio of the electric and magnetic field strengths. It is also possible that the circuit for determining the ratio of said field strengths should operate in conjunction with means for determining their phase difference which characterizes the rock as well. Connected to the output of the circuit 5 is a direct-reading calibrated display 6 whose indications correspond to the value of the electric resistance of a rock.

The outputs of the amplifiers 3 and 4 are connected also to key threshold comparison elements 7 and 8 whose inputs are connected to a reference voltage source 9. The outputs of the comparison elements 7 and 8 are connected, via integrating amplifiers 10 and 11, to the input of the automatic gain control circuit of the amplifiers 3 and 4. Connected to the inputs of the amplifiers 3 and 4 is a calibration signal generator 12.

Since the transmitting station may operate at different frequencies or there may be different transmitting stations, it is expedient that the calibration signal generator should comprise means for varying its operating frequency.

The functions of such a generator can be performed, for instance, by any LC-oscillator stabilized with a number of crystal cavities. By selecting the required cavity and the oscillatory circuit it will be possible to tune the generation 12 to the frequency of any transmitting station.

Connected to the output of the amplifier 4 is a pulse shaper 13 linked with the generator 12 and the comparison elements 7 and 8. At the end of every radiotelegraph signal of the transmitting station the pulse shaper 13 produces signals which simultaneously trigger the generator 12 and the comparison elements 7 and 8. The circuit of the pulse shaper 13 is adjusted so that it turns on the generator for a period which does not exceed the spacing interval between two adjucent signals of the transmitting station, i.e., for a period shorter than the spacing interval.

The pulse shaper 13 may be arranged around two electronic units 14 and 15, the first producing rectangular pulses equal in width to the radiotelegraph signals, and the second, generating gate pulses $d$, used to trigger the generator 12 and the threshold comparison elements 7 and 8.

A gate pulse is accomodated in the spacing interval between two radiotelegraph signals.

The unit 14 may be arranged as a well known collector-coupled detector with an output amplifier. The input of the unit 14 is fed with a transmitting station signal $a$ which has passed earlier through the amplifier 4. The output of the unit 14, which, in effect, is a detector, produces a signal $b$ whose shape corresponds to the envelope of the signal fed to its input.

After detection the signal is fed to the unit 15 comprising a differentiating circuit 17 with a pulse amplifier. The outputs of the pulse amplifier trigger a multivibrator 18 connected to differentiating circuit 17 and provided with an RC-circuit for pulse width adjustment and with an emitter follower 19. The trailing edge of the transmitting station signal which has been detected in the unit 14 is differentiated in the unit 15 and used to trigger the multivibrator. The width of the multivibrator pulse $d$ is selected so that the pulse would finish before the next signal of the transmitting station arrives to the amplifier 4. The multivibrator pulse $d$ triggers the generator 12 and the comparison elements 7 and 8. Thus, following the signal of the transmitting station is the calibration signal of the generator 13 which arrives to the input of the amplifiers 3 and 4, passes through the amplifier and strikes the input of the unit 14.

After detection this signal $c$ is fed also to the input of unit 15. But the trailing edge of this signal can not trigger the multivibrator since the latter requires a certain period of time to return to its initial state, the duration of this reset period being determined by the parameters of the RC-circuit.

Each comparison element 7 and 8 has a comparison circuit having an input which is supplied with all of the signals from the receiver (including a test signal) and from a test strobe which is located within the interval of the ratio-telegraph signal. For the duration of the test strobe, a switch within the comparison circuit is closed, and the test signal is fed to a suitable stabilitron having a high-accuracy opening threshold (i.e., temperature coefficient of $\mp 0.001$ percent). The top portion of the signal opens the stabilitron and is fed to an interpreting amplifier and then to the control input of the receiver, reducing its amplification to the required level.

The device operates as follows.

Electric and magnetic fields generated by the transmitting station in the telegraph mode are received by the sensors 1 and 2 which produce signals fed to the inputs of the amplifiers 3 and 4 respectively. After amplification these signals are fed to the circuit 5 which, according to the ratio of the amplitudes of the amplifier 3 and 4 output signals, determines the square of the ratio between the strengths of these fields.

Consider in detail the process of calibrating and adjusting the gains of the amplifiers 3 and 4.

After amplification in the amplifier 4 the signal $a$ of the transmitting station is fed to the input of the unit 14 for detection as described above. After detection the signal arrives to the input of the unit 15 which produces a gate pulse $d$ whose width, as stated above, is determined by the parameters of multivibrator circuit components. This gate pulse $d$ triggers simultaneously the calibration signal generator 12 and the comparison elements 7 and 8.

The calibration signal is fed to the inputs of the amplifiers 3 and 4 and after amplification it arrives to the comparison elements 7 and 8 comparising key threshold circuits for comparing the levels of the calibration signal, i.e., the generator signal which has passed through the amplifiers and the signal of the reference voltage source 9. The comparison elements 7 and 8 operate only in the presence of the calibration signal.

As it was stated above, the multivibrator can not be triggered for the second time by the trailing edge of the detected calibration signal and the latter, therefore, produces no gate pulse. Since the comparison elements 7 and 8 compare the calibration signal against a certain fixed voltage of the source 9, any change of the gain of the amplifiers 3 and 4 will result in a voltage appearing across the outputs of the comparison elements 7 and 8. This voltage is fed to the amplifiers-integrators 10 and 11 to be converted into a control signal for the automatic gain control circuit of the amplifiers 3 and 4. This control voltage is applied to the inputs of the amplifiers 3 and 4 adjustment system and is used to stabilize the gain of the amplifiers.

What we claim is:

1. A device for geophysical prospecting by mesuring the electric resistance of rocks with the help of radio-telegraph signals of a transmitting station which comprises: an electric field strength sensor; a magnetic field strength sensor; selective amplifiers provided with a gain control system and with means for tuning to the frequency of said transmitting station, one of said amplifiers being connected to said electric field strength sensor while the second of said amplifiers being connected to said magnetic field strength sensor; means for comparing parameters of said amplifier output signals, the result of the comparison being a measure of the rock electric resistance; a calibration signal generator whose frequency is equal to that of said transmitting station, the generator being connected to the inputs of said selective amplifiers; a pulse shaper connected to the output of one of said amplifiers, said shaper being connected by its output to said generator and serving to produce pulses to trigger this generator during spacing intervals between radiotelegraph signals; a reference voltage source; and voltage comparison elements, each being connected to said reference voltage source and to the output of the respective amplifier, said comparison elements being connected also to the pulse shaper to be triggered simultaneously with said generator while the outputs of said comparison elements being connected to said gain control system of the respective amplifier, said gain control system serving to vary the gain of the amplifier in accordance with the level of signals at the output of said comparison elements.

2. A device, as claimed in claim 1, which uses a selective amplifier with an automatic gain control circuit the input stage of which comprises comparison elements connected via amplifiers-integrators.

* * * * *